April 13, 1937.  K. D. LOOSE ET AL  2,076,657

CONTINUOUS LAMINATING MACHINE

Filed Oct. 2, 1935   9 Sheets-Sheet 1

INVENTORS
KENNETH D. LOOSE,
CHARLES W. WATKINS,
BY JOSEPH W. GREEN.

ATTORNEYS

April 13, 1937. K. D. LOOSE ET AL 2,076,657
CONTINUOUS LAMINATING MACHINE
Filed Oct. 2, 1935 9 Sheets-Sheet 4

Fig. 4.

INVENTORS
KENNETH D. LOOSE,
CHARLES W. WATKINS,
BY JOSEPH W. GREEN.
Toulmin & Toulmin
ATTORNEYS

INVENTORS
KENNETH D. LOOSE,
CHARLES W. WATKINS,
BY JOSEPH W. GREEN.
ATTORNEYS

UNITED STATES PATENT OFFICE 2,076,657

CONTINUOUS LAMINATING MACHINE

Kenneth D. Loose, Bronxville, N. Y., and Charles W. Watkins and Joseph W. Green, Dayton, Ohio, assignors to Loose-Wiles Biscuit Company, Long Island City, N. Y., a corporation of New York Application October 2, 1935, Serial No. 43,246

10 Claims. (Cl. 107—1)

This invention relates to machinery for use in bakeries, and in particular, to machines used in the preparation of dough prior to the baking operations.

One object of this invention is to provide a machine for combining dough with certain ingredients, known as enrichments, to form a laminated product, in sheet form, consisting of a plurality of layers of dough and enrichments.

Another object is to provide a machine for receiving the laminated dough sheet and multiplying the laminations by folding the dough sheet upon itself by lapping operations.

Another object is to provide devices for sealing the edges of the laminated dough sheet prior to the lapping operations.

Another object is to provide a lapping device wherein the dough sheet, during the depositing operations, is maintained in close proximity to the conveyor upon which the sheet is lapped, the lapping device moving to and fro across the conveyor, with its delivery point moving substantially parallel to the conveyor.

Another object is to provide a dough laminating and lapping machine wherein the lamination and lapping devices provide for the distribution of the enrichment materials throughout the dough without requiring undue working or mixing operations upon the dough.

Another object is to provide a dough laminating and lapping machine wherein the lapping device is caused to oscillate to and fro as well as reciprocate, thereby laying down the dough sheet at a point close to the receiving surface, regardless of the position of the lapping device in its path of motion.

Another object is to provide a continuously operating dough laminating and lapping machine in which the dough is fed onto a conveyor and ingredients inserted between the layers of dough, the laminated dough sheet thus formed travelling continuously through the machine and being acted upon by devices, causing it to be lapped and overlapped a multiplicity of times and rolled at various stages so that the dough sheet emerges in a continuous strip from the end of the machine, this dough sheet being thereby formed into a product having a large number of thin layers of dough and enrichment materials.

General construction

In general, the machine of this invention comprises a series of hoppers arranged in sequence and adapted to deposit dough and enriching materials upon a moving conveyor, thereby producing a long strip or sheet of dough in laminated form, and having alternate layers of dough and enrichment. The laminated sheet thus formed is fed between rollers with beveled edges in such a manner as to cause the edges of the dough sheet to be sealed, thereby preventing the escape of the enrichment materials. The dough sheet is further fed into a lapping device which deposits the dough upon a conveyor, and at the same time moves the sheet to and fro across the conveyor while the conveyor itself is moving.

This operation results in the lapping and overlapping of the dough sheet upon itself as it moves through the machine.

The thus overlapped sheet passes through rollers which press it down to an even thickness, and it is then conveyed to a second lapping device which brings about another overlapping of the previously overlapped dough sheet or strip. After being again overlapped the sheet passes through another set of rollers, by which it is again pressed into even form, whereupon it is carried upward and deposited upon another conveyor upon which further operations are carried out which are beyond the scope of the present invention. These further operations comprise cutting the dough into proper form for further treatment, or baking and the like.

The machine of this invention produces a laminated and lapped dough which may be used for a large variety of products, such as crackers, cookies and various types of wafers or biscuits. The purpose of the lamination is to distribute the enrichment materials throughout the dough without requiring the undue working or mixing of the dough, such operations detracting from the quality of the baked product obtained from said dough.

Hitherto, in producing baked articles of the type produced by the present machine, the dough and enrichment materials were prepared in batches and mixed together, either in mixing machines or by hand. The enrichment materials may be of a variety of kinds, such as fats, cheese, flavoring materials, or other materials of a different character than the dough. By the present invention this mixing and repeated working of the dough are avoided, a superior effect being obtained by the lamination of the dough with the enrichment materials between the dough layers, this being lapped, overlapped and rolled a plurality of times until the final product comprises an article with a large number of thin layers of alternate dough and enrichment material.

By this arrangement it is possible to employ a series of doughs having different characteristics. For example, the outer layers of dough may have firm characteristics, whereas the middle layer of dough may be too rich to form into an ordinary sheet of dough. By thus placing the rich layer between the outer layers the rich layer is given the necessary support, and with the layers of enriching materials enables a superior product to be made than could be prepared by the ordinary processes and apparatus. The number of times the sheet is overlapped by the lapping device can be regulated by varying the relative speeds of the lapping device and the conveyor upon which the sheet of dough is deposited. The result is a sheet of dough of lighter consistency than the prior art mixing methods and apparatus produce.

*Laminating mechanism*

Figures 1, 9:
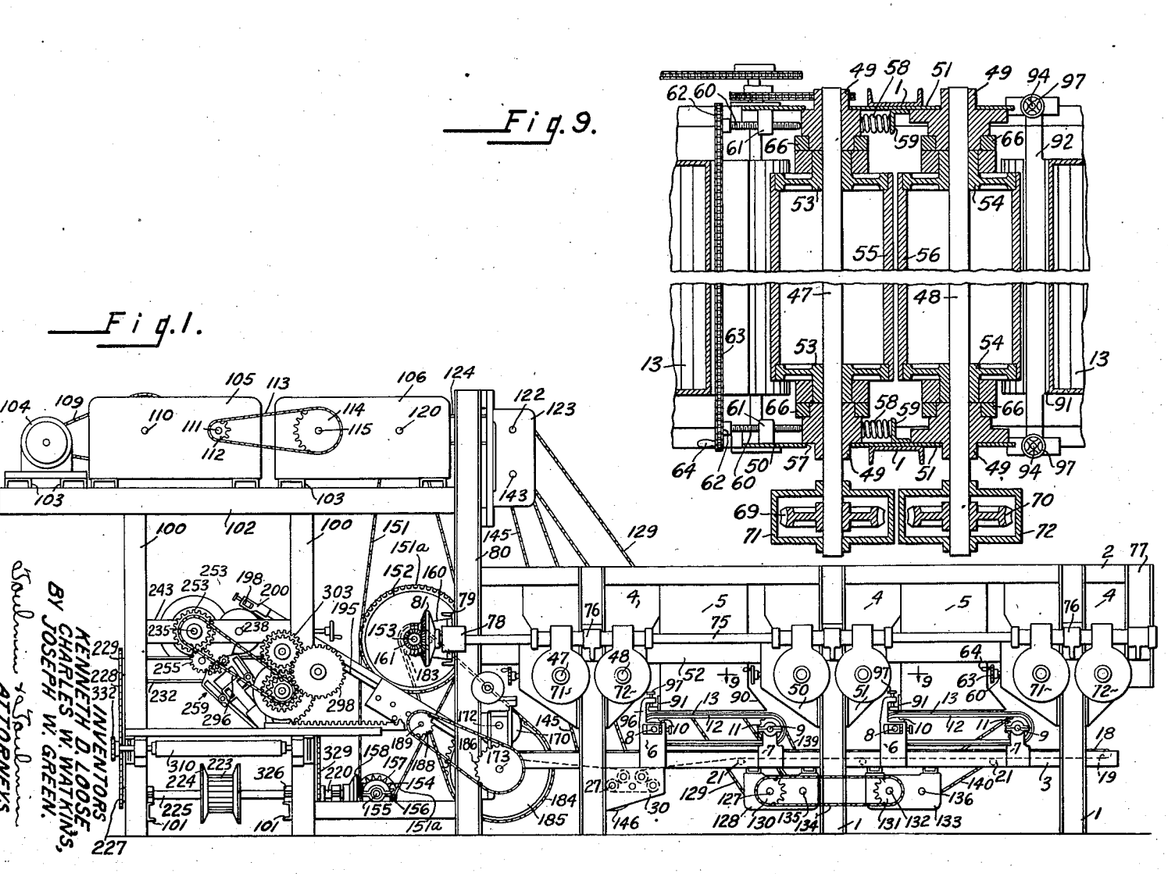
Figure 1 is a side elevation of the laminating section of the machine, together with the first lapping section thereof.
Figure 9 is a horizontal section through the hopper feed rollers, taken along the line 9—9 of Figure 1.

The laminating portion of the machine is shown at the right-hand side of Figure 1, and comprises vertical frame members 1 interconnected by longitudinal top and bottom frame members 2 and 3, connected by suitable cross members. In the framework thus formed is mounted an alternate series of dough hoppers 4 and enrichment hoppers 5. In the embodiment of the invention shown and described there are three dough hoppers 4 and two enrichment hoppers 5 arranged between the dough hoppers. Mounted upon the lower frame members 3, as by the supports 6 and 7, are shafts 8 and 9 carrying sprockets 10 and 11 (Figures 1 and 5) upon which an endless enrichment conveyor 12 operates.

The endless enrichment conveyor 12 consists of interconnected slats 13 moving in an orbital path between the shafts 8 and 9, around the sprockets 10 and 11, the upper section of this conveyor passing immediately beneath the enrichment hopper 5. One of these conveyor assemblies is arranged beneath each enrichment hopper 5. The shaft 8 is arranged in bearing blocks 14, which are movable to and fro in rectangular slots 15, under the influence of the screw shaft 16 and the hand wheel 17. By turning the hand wheel 17 the conveyor 12 may be made tighter or looser, as the particular working conditions demand. The driving arrangement for the enrichment conveyor 12 will be subsequently described.

Figure 7:
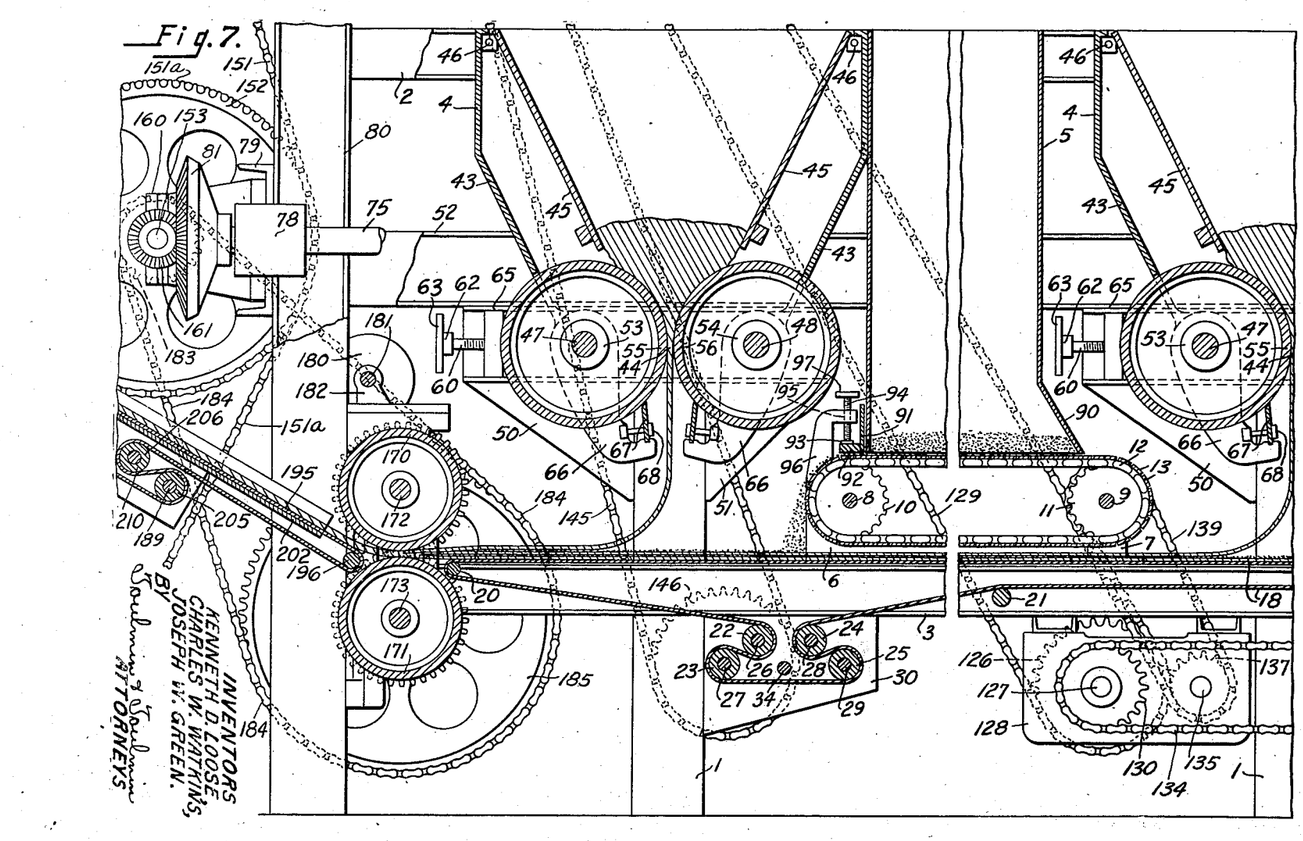
Figure 7 is a vertical section through the laminating part of the machine shown in Figure 5, taken along the line 7—7 of Figure 4.

Also mounted upon the longitudinal frame members 3 and supported therebetween is the dough-laminating conveyor 18, supported at the right-hand end of the machine upon the roller 19 journalled upon the longitudinal frame members 3. The dough-laminating conveyor 18 is of the endless type, its upper section extending horizontally along the longitudinal frame members 3 from the right-hand to the left-hand ends thereof, the left-hand end being supported by the roller 20 (Figure 7), also journalled in and between the longitudinal frame members 3. The dough-laminating conveyor 18 is supported at intermediate points along its path by guide rollers 21 (Figure 7). At a point near its left-hand end (Figures 5 and 7) the dough-laminating conveyor 18 passes around rollers 22, 23, 24, and 25, secured to the shafts 26, 27, 28, and 29, respectively. The ends of these shafts are journalled in the frame members 30 secured to the longitudinal frame members 3 and vertical frame members 1, and are drivingly interconnected by gearing. The shaft 27 (Figure 5) carries a pinion 31 meshing with a pinion 32 upon the shaft 26. This, in turn, meshes with a pinion 33 mounted upon the shaft 34. The pinion 33 meshes with a pinion 35 upon the roller shaft 28, and this in turn, meshes with a pinion 36 mounted upon the roller shaft 29. By this means the dough-laminating conveyor 18 is positively driven from the shaft 27, the remaining driving connections of which will be subsequently described.

The top of the laminating section of the machine (Figure 4) is provided with a platform 40, which has apertures 41 leading into the dough hoppers 4 and apertures 42 leading into the enrichment hoppers 5. The dough hoppers 4 consist of bins extending downwardly from the platform 40 and aperture 41, and are provided with sloping walls 43 leading to a delivery aperture 44 at the bottom of each hopper (Figure 7). Secured to the opposite side walls of the dough hoppers 4 (Figure 7) are adjustable guide plates 45, pivotally mounted, as at 46, upon the side walls. At the lower extremities of the sloping walls 43 are the roller shafts 47 and 48, these being journalled in the bearing blocks 49 (Figure 9), mounted in the channel members 65, respectively, (Figure 7). The side plates 50 and 51 are secured to the frame uprights 1 and the middle longitudinal frame members 52.

On the shafts 47 and 48 are mounted the hubs 53 and 54 of the hopper feed rollers 55 and 56, respectively. The spacing between the peripheries of the hopper feed rollers 55 and 56 may be varied. This is accomplished by having the bearing block 49 horizontally movable within elongated apertures 57. The bearing blocks 49 are urged to the left (Figure 9) by the coil springs 58, having their opposite ends resting against the angle members 59 secured to the channel members 65 and the side plates 51. On their opposite sides the bearing blocks 49 are engaged by the screw shafts 60, threaded through the posts 61 mounted on the channel members 65 and the side plates 50 and carrying the sprockets 62, interconnected by the sprocket chain 63.

One of the sprockets 62 is provided with a hand crank 64 by which both sprockets 62 and both screw shafts 60 may be simultaneously rotated. When this is done the bearing blocks 49 and the hopper feed roller 55 are caused to move to and fro, thus causing the space between the hopper feed rollers 55 and 56 to be varied, as desired. During their reciprocation the bearing blocks 49 are supported in the channel members 65 (Figure 7) and the side plates 50.

Figure 4:
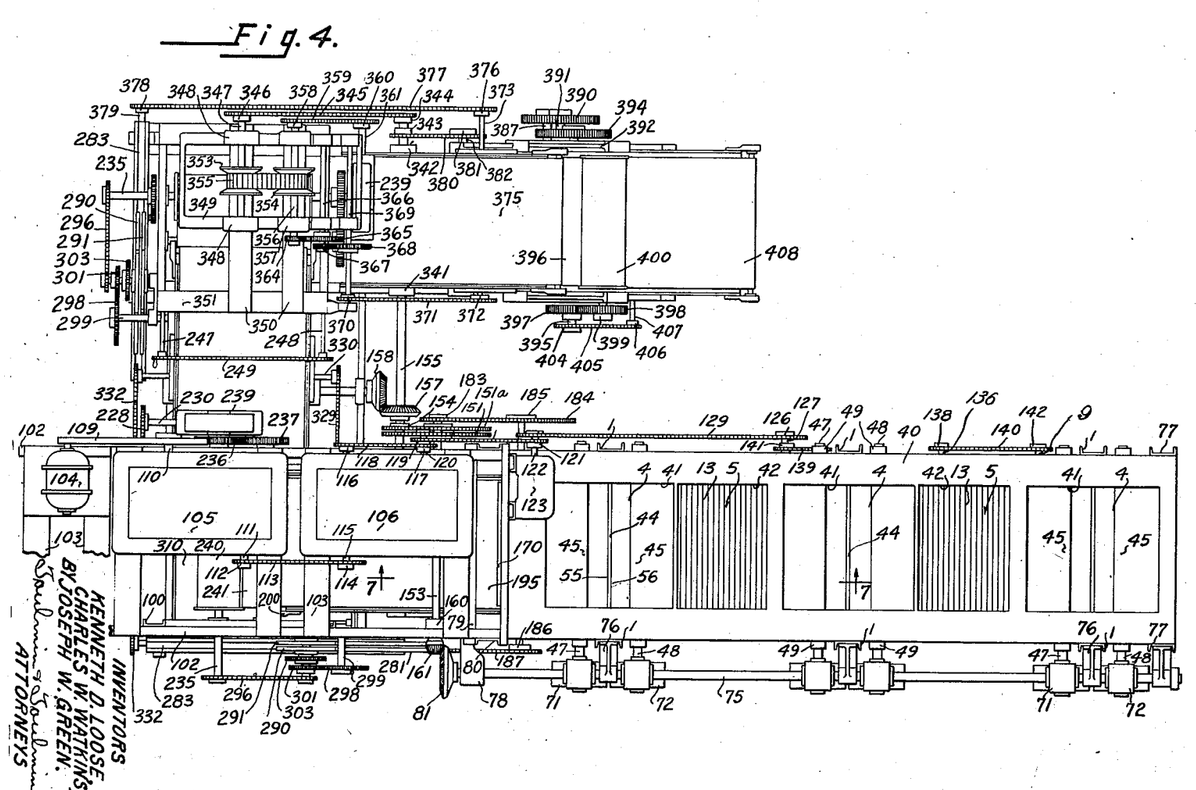
Figure 4 is a plan view of the machine.
Figure 5:
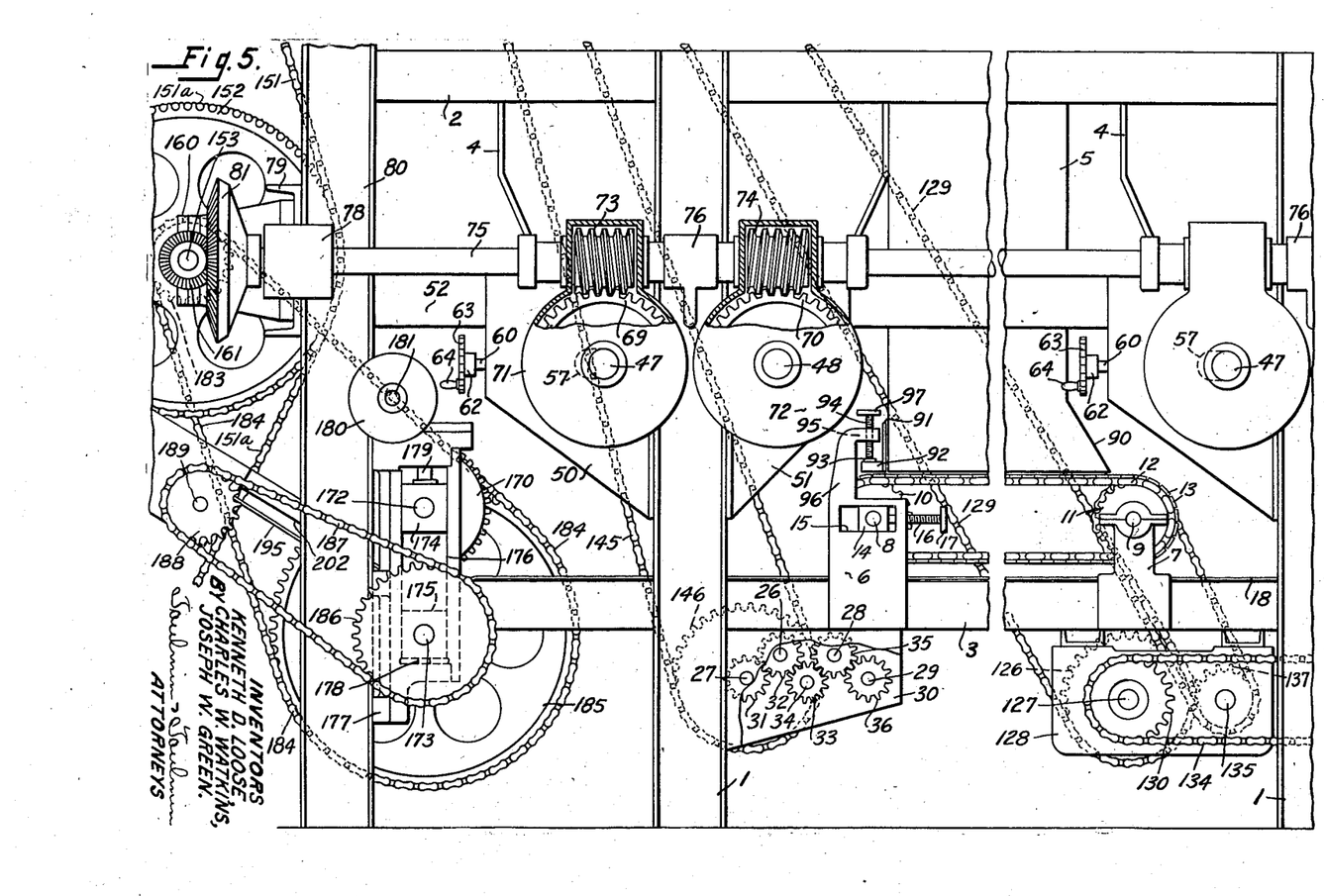
Figure 5 is an enlarged side elevation, partly broken away, of a portion of the laminating section of the machine.

The bearing blocks 49 serve to support scraper arms 66, to the outer ends of which are attached the scrapers 67, as by the cap screws 68 (Figure 7). The scrapers 67 serve to prevent dough from passing completely around the peripheries of the hopper feed rollers 55 and 56. The roller shafts 47 and 48 on their outer ends carry worm gears 69 and 70 within the housings 71 and 72 (Figures 5 and 9). Meshing with the worm gears 69 and 70 are the right-hand and left-hand worms 73 and 74, respectively. The worms 73 and 74 are mounted upon the hopper drive shaft 75, this being journalled in bearing brackets 76 secured to the frame uprights 1 and also to the end frame upright 77 (Figures 1 and 5). At its left-hand end the hopper drive shaft 75 is journalled in the bearing bracket 78 secured to the frame cross member 79, which in turn, is secured to the frame end upright 80 (Figures 1 and 4). Beyond the bearing bracket 78 the hopper drive shaft 75 is provided with a bevel gear 81, which provides the driving connection therefor. The remainder of the driving connections will be subsequently described.

The enrichment hoppers 5 are in the form of rectangular bins extending downwardly from the platform apertures 42 (Figures 4, 5 and 7), and are provided at one end with an outwardly flared side wall 90. The bottom of each enrichment hopper 5 is open so as to discharge the contents of the hopper directly onto the upper surface of the enrichment conveyor 12. The quantity of enrichment materials deposited upon the enrichment conveyor 12 is regulated by the gate 91, having an arm 92 carrying a bearing 93, which rotatably receives the lower end of the screw shaft 94. The screw shaft 94 passes through a threaded bore 95 in the bracket portion 96 of the support 6. The screw shaft 94 at its upper end is provided with a hand wheel 97, by the turning of which the gate 91 is raised or lowered, thus regulating the thickness of the enrichment layer deposited upon the conveyor 12.

*Main driving mechanism*

Figures 2, 10, 11, 12, 13, 14:
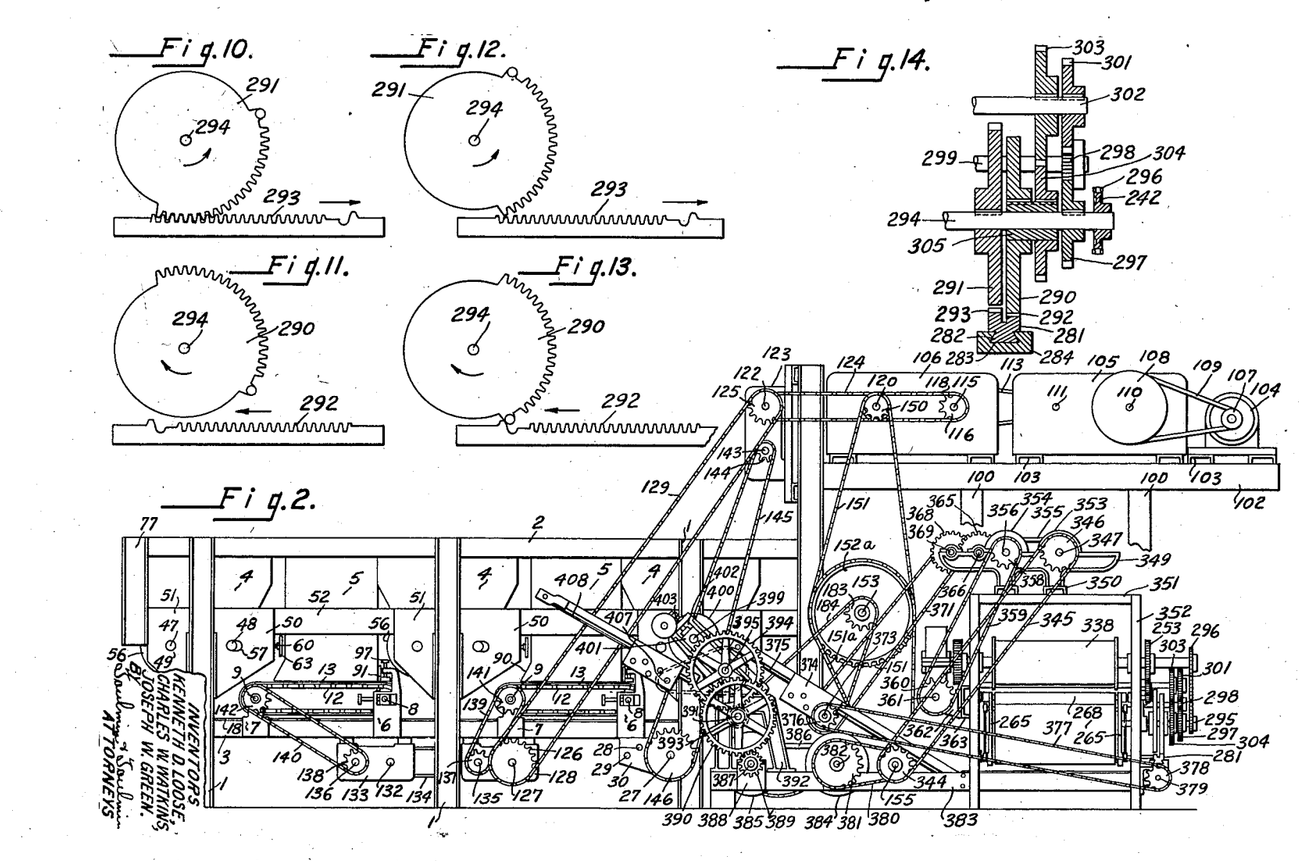
Figure 2 is a side elevation of the machine shown in Figure 1, but looking from the opposite side thereof.
Figures 10, 11, 12 and 13 show diagrammatically the right and left-hand skip gears employed in the driving mechanism for the lapping device in the extreme positions thereof.
Figure 14 is an enlarged vertical section through the lapping device driving mechanism shown in Figures 10 to 13, inclusive, taken along the line 14—14 of Figure 6.

The main driving mechanism (Figures 1, 2, 3 and 4) is mounted upon the top of the left-hand end of the machine, as shown in Figure 1. This left-hand end comprises a framework having vertical uprights 100 interconnected by cross members 101, and having the top members 102 serving to support the top cross members 103 (Figures 1 and 2). The top cross members 103 serve to support the main driving motor 104 and a pair of variable speed transmissions 105 and 106. The motor 104 carries a pulley (Figure 2) 107, which drives a pulley 108 upon the variable speed transmission 105 by means of the belt 109. The pulley 108 is mounted upon a shaft 110 which serves as the in-put shaft of the variable speed transmission 105, the out-put shaft 111 of which carries the sprocket 112 (Figure 1), around which passes the sprocket chain 113 forming a driving connection with the sprocket 114 upon the in-put shaft 115 of the variable speed transmission 106.

The in-put shaft 115 on its opposite end carries the sprocket 116. The latter is drivingly interconnected with the sprocket 117 by the sprocket chain 118. The hub of the sprocket 117 is fixedly connected to the hub of the sprocket 119, but the whole is arranged to rotate loosely upon the output shaft 120 of the variable speed transmission 106. The sprocket 119 is interconnected with the sprocket 121 upon the in-put shaft 122 of the variable speed transmission 123 by means of the sprocket chain 124. The in-put shaft 122 likewise carries the sprocket 125 (Figures 2 and 4), which is interconnected with the sprocket 126 on the in-put shaft 127 of the enrichment conveyor variable speed transmission 128 through the sprocket chain 129 (Figure 2).

This in-put shaft 127 at its opposite end carries a sprocket 130 interconnected with the sprocket 131 on the in-put shaft 132 of the enrichment conveyor variable speed transmission 133 by means of the sprocket chain 134. The out-put shafts 135 and 136 of the enrichment conveyor variable speed transmissions 128 and 133 are provided with sprockets 137 and 138 (Figure 2), having sprocket chains 139 and 140 leading to the sprockets 141 and 142, mounted upon the drive shafts 9 of the two enrichment conveyors 12 (Figures 2, 5 and 7). In this manner the enrichment conveyors 12 are driven from the main driving motor 104, and their speeds are adjustably regulated individually as well as collectively through the different variable speed transmissions. The out-put shaft 143 of the variable speed transmission 123 (Figure 2) carries a sprocket 144 having a sprocket chain 145 leading to the sprocket 146 upon the shaft 27, driving the dough conveyor 18 (Figures 2 and 5), in the manner previously described.

The output shaft 120 of the variable speed transmission 106 carries the sprocket 150, having the sprocket chain 151 meshing with the sprocket 152 mounted upon the shaft 153. The latter also carries a second sprocket 152a similar to sprocket 152 and carrying the chain 151a (Figures 2 and 8) which encircles the sprocket 154 upon the shaft 155. The latter is journalled in the bearing blocks 156 and carries a bevel gear 157, meshing with a bevel gear 158 which serves to drive the lapping conveyor mechanism, as subsequently described. The shaft 153 carrying the sprockets 152 and 152a is journalled in the bearing brackets 160, and carries the bevel pinion 161. The latter meshes with the bevel gear 81 mounted upon and driving the hopper drive shaft 75, in the manner previously described.

*Consolidating rolls*

The dough-laminating conveyor 18 (Figure 7) discharges the sheet or strip of laminated dough into the space between the upper and lower consolidating rolls 170 and 171, mounted upon the shafts 172 and 173, respectively. The roll shafts 172 and 173 (Figure 5) are journalled in the bearing blocks 174 and 175, respectively, these being arranged within the rectangular apertures 176 of the consolidating roll-supporting brackets 177. The latter are secured to the frame uprights 80. The lower consolidating roll bearing block 175 is fixed in position and rests upon the member 178, whereas the upper bearing block 174 is slidable within the aperture 176, this sliding being controlled by the screw shafts 179 secured thereto. The screw shafts 179 for the bearing blocks 174 at the opposite ends of the roll shaft 172 are interconnected by bevel gearing (not shown), operated by the hand wheel 180 upon the shaft 181 rotatably mounted in the brackets 182 (Figure 7) upon the upper end of the consolidating roll support bracket 177. By this mechanism the space between the consolidating rolls 170 and 171 may be accurately adjusted.

The consolidating rolls 170 and 171 are driven from the shaft 153 in the upper left-hand corner of Figures 5 and 7, the driving connections of this shaft 153 having been previously described. The shaft 153 carries a sprocket 183 (Figures 5 and 7), having the sprocket chain 184 driving the sprocket 185 mounted upon the end of the lower roll shaft 173. The opposite end of the shaft 173 (Figure 5) carries a sprocket 186, which has a sprocket chain 187 communicating power to the sprocket 188 upon the roller shaft 189. The latter is operative to drive the first dough transfer conveyor, the construction of which is subsequently to be described.

Dough-transfer conveyor

Figure 8:
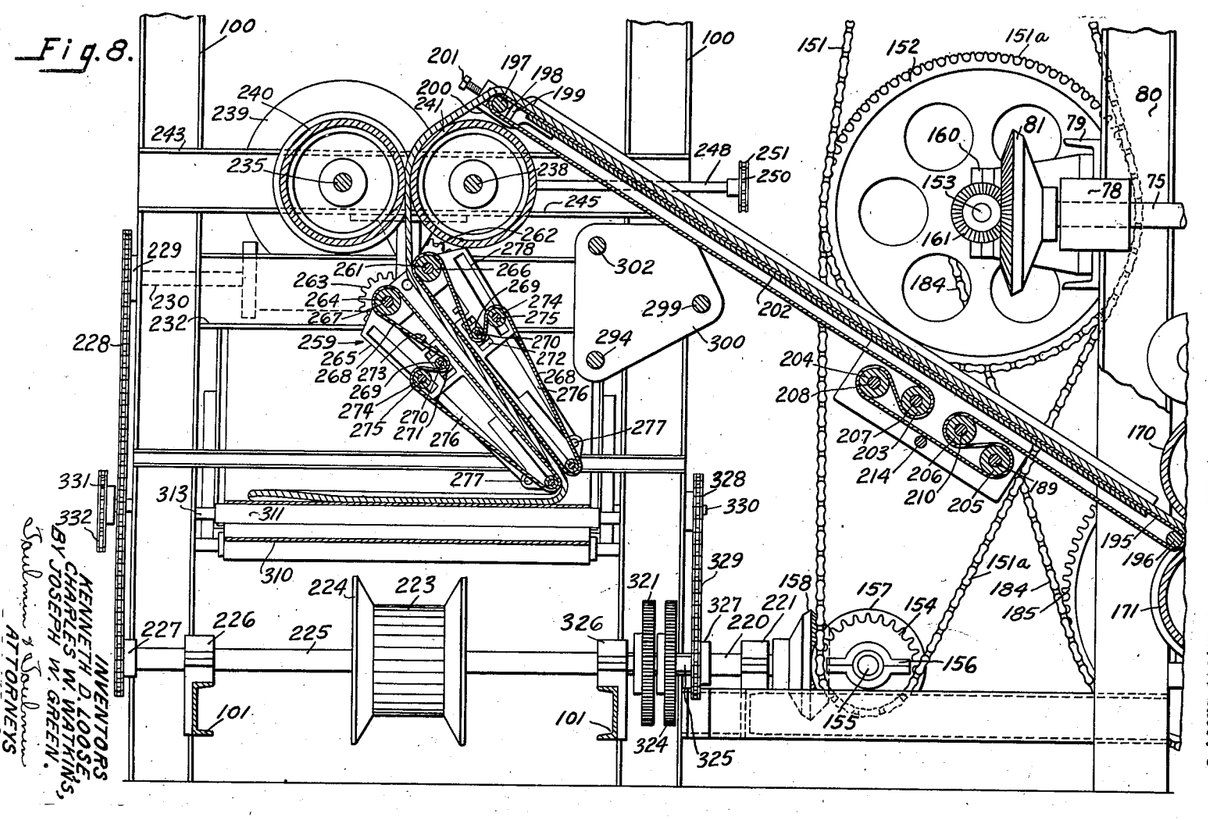
Figure 8 is a vertical section through the first lapping part of the machine, taken along the line 8—8 of Figure 3.

There are four dough-transfer conveyors, the first of which is arranged immediately beyond the consolidating rolls 170 and 171. The first dough-transfer conveyor 195 (Figure 7) consists of a belt, similar to the dough-laminating conveyor 18 and similarly supported upon the opposite end rolls 196 and 197, respectively, (Figures 7 and 8). The upper end roll 197 is journalled in the bearing blocks 198, slidably mounted in the rectangular apertures 199 of the dough-transfer conveyor framework 200. The bearing blocks 198 may be moved to and fro to tighten or loosen the dough-transfer conveyor 195 by turning the screw shafts 201 secured to the bearing blocks 198. The dough-transfer conveyor 195, during the upper part of its travel, rests upon the bed plate 202, which in turn, is supported by the framework 200. The dough-transfer conveyor 195, along the lower part of its travel, passes around the rollers 203, 204, 205 and 206, mounted respectively upon the roller shafts 207, 208, 189 and 210, in much the same manner as the dough-laminating conveyor 18, previously described.

On the end of the roller shaft 208 is mounted a pinion 211 (Figure 6), meshing with a similar pinion 212 mounted upon the end of the roller shaft 207. The pinion 212 meshes with a pinion 213 upon the shaft 214, and the latter meshes with a pinion 215 upon the end of the roller shaft 210. The pinion 215 meshes with a pinion 216 mounted upon the roller shaft 189, the latter being driven by the sprocket 188 from the sprocket chain 187, in the manner previously described.

Lapping device

Figure 3:
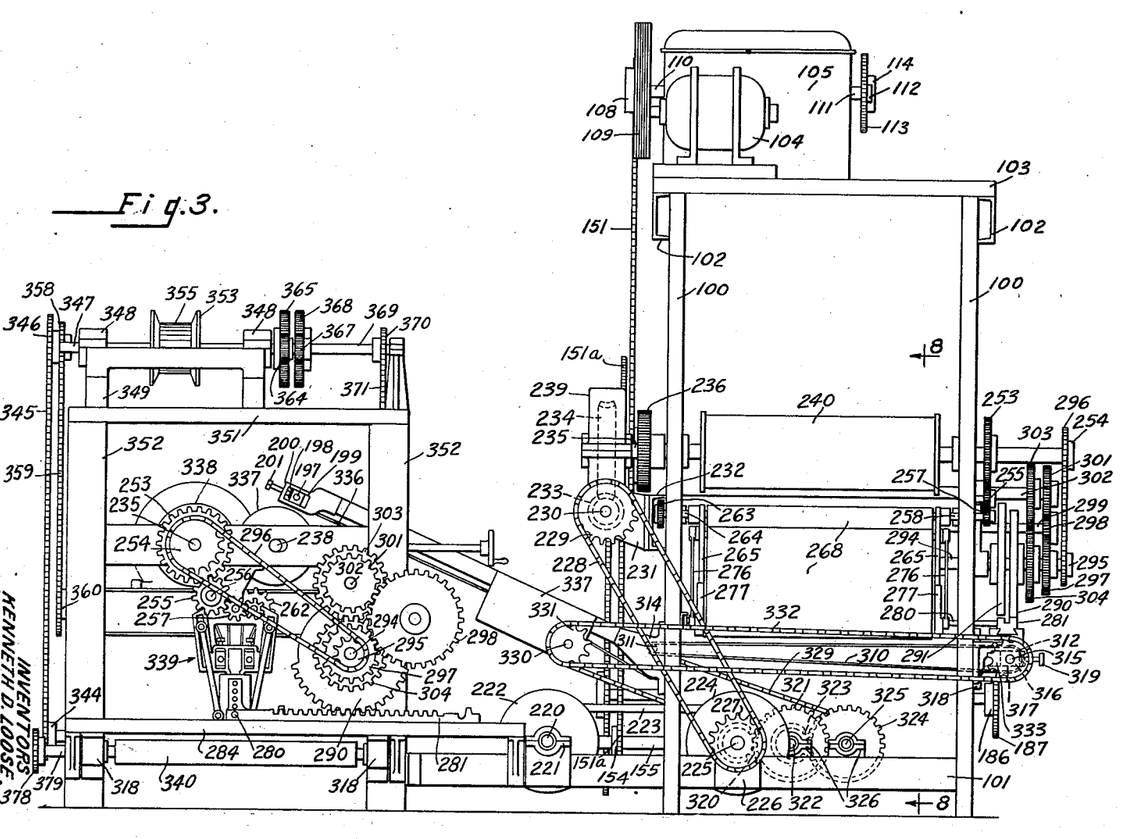
Figure 3 is a left-hand end elevation of the machine shown in Figure 1.
Figure 6:
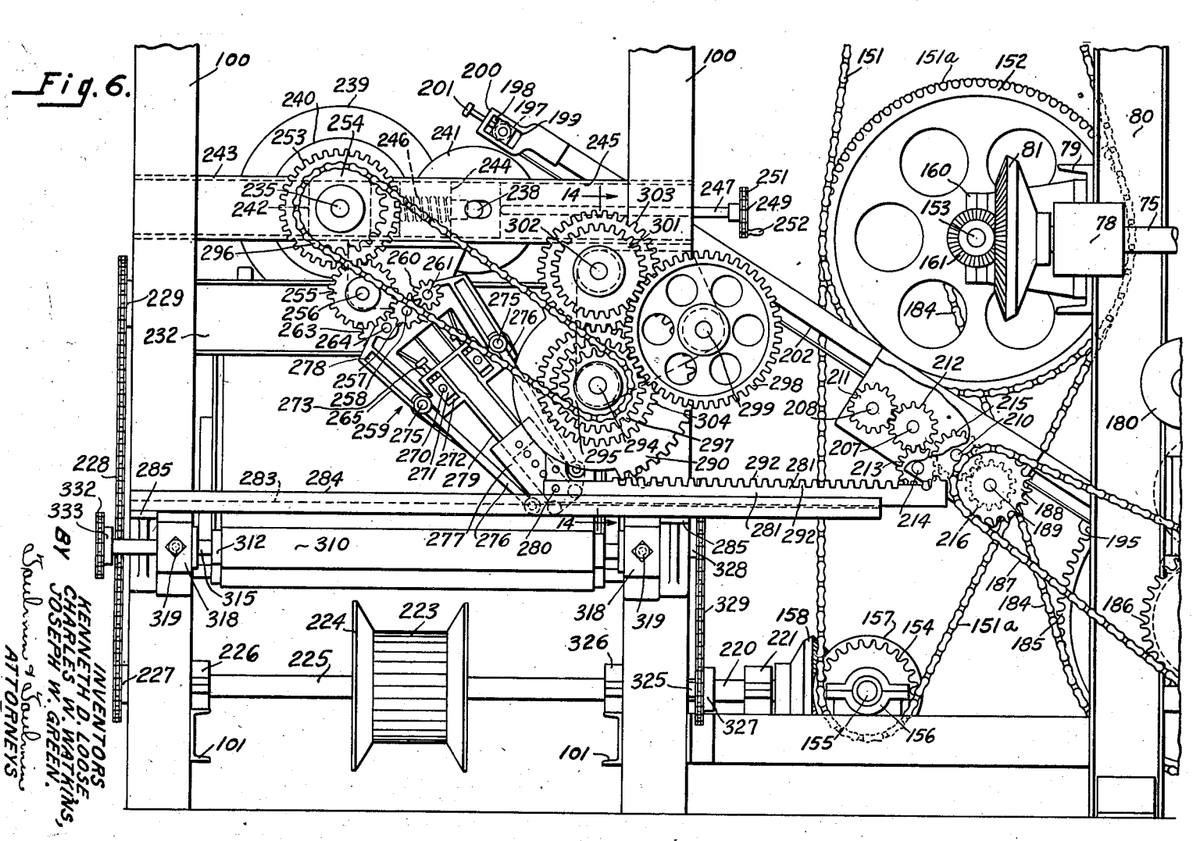
Figure 6 is an enlarged side elevation, partly broken away, of the first lapping section of the machine.

There are two lapping devices in the machine, the first of which is located immediately beyond the first dough-transfer conveyor 195 (Figure 6). This mechanism is driven by the bevel gear 158, shown in the lower right-hand corner of Figure 6. The bevel gear 158 meshes with the bevel gear 157, mounted upon the shaft 155, this shaft being driven by the sprocket 154 from the sprocket chain 151a (Figure 6) as previously described. The bevel gear 158 is mounted upon the shaft 220, supported in the bearing brackets 221 (Figures 3 and 6). The shaft 220 carries a pulley 222, which has a belt 223 of the linked slat type, communicating power to a similar pulley 224 upon the shaft 225 supported in the bearing brackets 226. The bearing brackets 221 and 226 are supported by the frame cross members 101. The shaft 225 is provided with a sprocket 227 having a sprocket chain 228, communicating power to a sprocket 229 upon the shaft 230 journalled in the bracket 231, secured to the longitudinal frame member 232.

The shaft 230 (Figure 3) carries a worm 233, meshing with a worm gear 234 upon the feed roll shaft 235. The latter carries a gear 236, meshing with a similar gear 237 upon the feed roll shaft 238. The worm gear 234 and the worm 233 are contained within the housing 239. The feed roll shafts 235 and 238 carry feed rolls 240 and 241, respectively, (Figures 6 and 8). The feed roll shaft 235 is journalled in the fixed bearing blocks 242, supported in the longitudinal frame members 243, whereas the feed roll shaft 238 is journalled in the movable bearing blocks 244 (Figure 6), slidably mounted in the channel-like portion 245 of the frame members 243. The movable bearing blocks 244 are urged in one direction by the coil springs 246, and in the opposite direction by the screw shafts 247 and 248 (Figures 6 and 8), carrying sprockets 249 and 250, interconnected by the sprocket chain 251. The sprocket 249 is provided with a crank handle 252, whereby both screw shafts 247 and 248 may be simultaneously rotated, and the bearing blocks 244 and feed roller 241 moved to and fro, thereby adjusting the space between the feed rollers 240 and 241.

On the opposite end of the feed roller shaft 235 from the gear 236 are mounted the gear 253 and sprocket 254. The gear 253 meshes with an idler gear 255 mounted upon the shaft 256 and meshing with the idler pinion 257 upon the pivot shaft 258 of the lapper, generally designated 259 (Figure 6). The pinion 257 meshes with a pinion 260, mounted upon the shaft 261, the opposite end of which (Figure 8) carries a gear 262, meshing with a similar gear 263 upon the shaft 264. These shafts are journalled in the end frames 265 of the lapper 259.

The shafts 261 and 264 are provided with rollers 266 and 267, respectively, serving to support the lapper belt 268 at the top portion of its travel. The lapper belt 268 is supported at an intermediate point by the rollers 269 (Figure 8), mounted upon the shaft 270. The latter are journalled in the bearing blocks 271, which are adjusted to and fro within the rectangular apertures 272 by the screw shafts 273, thereby tightening or loosening the lapper belt 268. Beyond the rollers 266 the lapper belt 268 passes over the rollers 274, rotatably mounted upon the shafts 275, these in turn, being journalled in the upper ends of the connecting rods 276 (Figure 6), the lower ends of which are pivotally mounted upon the slidable members 277. The upper ends of the connecting rods 276 reciprocate in rectangular guideways 278, whereas the slidable members 277 are adapted to reciprocate within the guideway 279 in the lapper end frames 265 (Figure 6).

Extending outward from one of the slidable members 277 is a shaft 280 (Figure 3), terminating in a double rack 281. The bottom part of the double rack 281 is dove-tailed, as at 282 (Figure 14) and is reciprocably received within a dovetailed groove 283 in a supporting member 284 mounted between the frame uprights 100 (Figure 6). Consequently, it will be seen that when the double rack 281 is moved to and fro along the supporting member 284, the lapper 259 will swing pendulum-like to and fro, and the slidable members 279 will reciprocate back and forth on the end frames 265, thereby causing the lower or delivery end of the lapper 259 to follow a horizontal path. The supporting member 284 is mounted upon brackets 285, attached to the frame uprights 100.

The mechanism by which the double rack 281 is reciprocated in this manner consists of a pair of skip gears 290 and 291, each having teeth along but a part of its periphery (Figures 6 and 10 to 14). The teeth on the skip gear 290 mesh with the outer rack portion 292, whereas the teeth upon the skip gear 291 mesh with the inner rack portion 293, both of these rack portions being located upon the double rack 281. The skip gear 291 is keyed to the shaft 294 (Figure 14), this shaft being driven by the sprocket 295 mounted thereon, and receiving power, by way of the sprocket chain 296, from the sprocket 242 upon the feed roll shaft 235 (Figure 6).

Keyed to the shaft 294 is a gear 297 (Figure 14), meshing with an idler gear 298 upon the shaft 299, the latter being journalled in the plate 300, secured to the frame upright 100 (Figure 8). The idler gear 298 meshes with a gear 301, keyed to the shaft 302. Also keyed to this shaft is a gear 303 meshing with the gear 304, keyed to the sleeve 305 (Figure 14). Also keyed to the sleeve 305 is the skip gear 290, the sleeve 305 itself being loosely mounted upon the shaft 294.

In this manner the skip gears 290 and 291 engage their respective rack portions 292 and 293, the teeth on one skip gear serving to move the rack in one direction, whereupon the teeth of the other skip gear engage the corresponding rack portion to force the rack in the opposite direction (Figures 10 to 13). In Figure 11 the outer skip gear 290 is shown prior to its engagement with its rack portion 292, whereas the inner skip gear 291 (Figure 10) is shown near the end of its engagement with its rack portion 293 at the same instant. In Figure 13, however, the skip gear 290 is shown as having moved around into a position starting its engagement with its rack portion 292, while the inner skip gear 291 in Figure 12 is just completing its engagement with its rack portion 293.

The lapping conveyor 310, upon which the dough is deposited from the lapper 259, consists of an endless belt arranged between rollers 311 and 312. The roller 311 is mounted upon the shaft 313, suitably journalled in the frame brackets 314 attached to the frame uprights 100 (Figures 3 and 8). The roller 312 is mounted upon the shaft 315, journalled in the bearing blocks 316, which are slidably mounted in the rectangular apertures 317 in the supporting brackets 318. The latter are mounted upon the frame uprights 100. The lapping conveyor 310 may be tightened or loosened by moving the bearing blocks 316 inward or outward by means of the screw shafts 319.

The lapping conveyor is driven from the shaft 225 through the following intermediate mechanism. Mounted on the shaft 225 (Figure 3) is a gear 320, meshing with a gear 321 upon the shaft 322, the latter carrying a pinion 323, meshing with a gear 324 upon the shaft 325. These shafts 322 and 325 are supported upon bearing brackets 326. The shaft 325 (Figure 8) carries a sprocket 327, driving a sprocket 328 through the sprocket chain 329. The sprocket 328 is mounted upon a shaft 330. The shaft 330 carries a sprocket 331, driving a sprocket chain 332, which in turn, drives the sprocket 333 upon the end of the shaft 315, which carries the roller 312 supporting one end of the lapping conveyor 310.

Second dough-transfer conveyor

The second dough-transfer conveyor (Figure 3) serves to convey the lapped dough from the first lapping device, shown on the right-hand side of Figure 3, to the second lapping device, shown on the left-hand side thereof. The second dough-transfer conveyor 336 is of similar type to the first dough-transfer conveyor 195, and is similarly operated, consequently, like parts are designated with similar reference numerals, and no further description is required. The second dough-transfer conveyor is driven from the shaft 330, which extends through the side plates 337 thereof, from one side of the conveyor to the other. This shaft 330 carries a roller and pinions similar to the devices described in connection with the first dough-transfer conveyor 195. The connections by which the shaft 330 is driven have just been described.

Second lapping device

The second lapping device shown on the left-hand side of Figure 3, is mounted in an auxiliary framework parallel to the main framework containing the first lapping device, and is of similar construction (Figures 3 and 4). This mechanism receives the once lapped dough from the second dough-transfer conveyor 336 (Figure 3) and directs it between the feeding rolls 337 and 338 into the second lapper, generally designated 339, where it is distributed upon the second lapping conveyor, generally designated 340, in a manner identical with that of the first lapping device previously described. Accordingly, similar reference numerals will be used for the details of the second lapping device, and a further description appears unnecessary.

The driving power of the second feeding rolls 337 and 338, the second lapper 339 and the second lapping conveyor 340 is received through the shaft 155 (Figure 4), which is driven from the main driving motor 104 in a manner previously described. The rearward extent of the shaft 155 is journalled in bearings 341 and 342, beyond which it is provided with sprockets 343 and 344. The sprocket 344 carries a sprocket chain 345 which drives a sprocket 346 (Figure 2), mounted upon the shaft 347, which in turn, is journalled in bearings 348 (Figure 4) upon the frame 349, mounted upon the cross members 350 supported upon the top members 351, these being carried by the vertical frame uprights 352.

The shaft 347 carries a pulley 353 which drives a similar pulley 354, through the belt 355, the latter being composed of interconnected slats. The pulley 354 is mounted upon the shaft 356 (Figure 4), journalled in bearing blocks 357 and carrying the sprocket 358 upon one end thereof (Figure 2). The sprocket 358 carries the sprocket chain 359, driving the sprocket 360 upon the shaft 361, journalled in the supporting bracket 362 attached to the frame cross member 363, supported by the frame uprights 352.

The shaft 361 of the second lapping device corresponds to the shaft 230 of the first lapping device, previously described, and the subsequent connections are of identical construction and operation. Accordingly, similar reference numerals are used for these corresponding parts, and a further description thereof appears unnecessary.

The shaft 356, upon the opposite end from the sprocket 358, carries a pinion 364 (Figure 4) which meshes with a gear 365 mounted upon the shaft 366, the latter being journalled in the frame 349. The shaft 366 also carries a pinion 367 (Figure 4) meshing with a gear 368 mounted upon the shaft 369, likewise journalled in the frame 349. The shaft 369 carries a sprocket 370, carrying a sprocket chain 371 arranged to drive a sprocket 372 upon the shaft 373, journalled in the side plates 374 of the third dough-transfer conveyor 375 (Figure 2). On the opposite end of the shaft 373 is a sprocket 376, carrying a sprocket chain 377 driving a sprocket 378 upon the shaft 379, operating the second lapping conveyor 340. The subsequent driving connections, structure and operation of the second lapping conveyor 340 are similar to those of the first lapping conveyor 310, and similar reference numerals are employed (Figure 3).

*Final dough-conveying and treating mechanism*

The third dough-transfer conveyor 375 is likewise similar to the first and second dough-transfer conveyors 195 and 336, respectively, previously described, hence, no further description is given.

The sprocket 343 on the shaft 155 carries a sprocket chain 380, driving a sprocket 381 upon a shaft 382 (Figures 2 and 4), journalled in the horizontal frame members 383. The shaft 382 carries a pulley 384 which drives a similar pulley 385 through a belt 386. The pulleys 384 and 385 and the belt 386 are of similar construction to the pulleys 222 and 224 and the belt 223. The pulley 385 is mounted upon the shaft 387, journalled in the brackets 388 upon the horizontal frame members 383, this shaft carrying a pinion 389 meshing with a gear 390 upon the shaft 391 (Figure 2) journalled in the subframe 392.

The shaft 391 carries a pinion 393 meshing with a gear 394 upon the roll shaft 395 of the second consolidating roll assembly. The shaft 395 is likewise supported by the subframe 392 and carries the lower consolidating roll 396, and likewise the gear 397 meshing with a similar gear 398 upon the upper consolidating roll shaft 399. The latter is similarly journalled in the subframe 392 and carries the upper consolidating roll 400.

The shaft 399 is mounted in bearing blocks 401, reciprocable within the rectangular apertures 402 by means of the screw shaft 403 (Figure 2), whereby the distance between the consolidating rolls 396 and 400 may be accurately adjusted. A sprocket 404, likewise mounted upon the shaft 395, carries a sprocket chain 405, arranged to drive the sprocket 406 upon the shaft 407 (Figure 4).

The shaft 407 drives the fourth dough-transfer conveyor 408. This conveyor is similar in construction and operation to the first, second and third dough-transfer conveyors previously described. The fourth dough-transfer conveyor 408 deposits the dough sheet upon the apparatus with which further operations are conducted upon the dough. This apparatus forms no part of the present invention, and may include, for example, cutting the dough sheet into various forms and transferring it to suitable baking ovens.

*Operation*

In the operation of the machine of this invention, the dough batch is deposited in the dough hoppers 4 through the filling apertures 41 (Figures 1 and 4). At the same time the enrichment materials are placed in the enrichment hoppers 5 through the filling apertures 42. The dough passes downwardly between the feeding rolls 55 and 56 (Figure 7) of each hopper and deposits itself upon the dough-laminating conveyor 18. The dough from the right-hand hopper 4, in Figure 1, moves along this conveyor until it comes beneath the left-hand end of the right-hand enrichment conveyor 12, which deposits its charge of enrichment materials upon the sheet of dough coming from the first dough hopper 4.

The dough sheet with its layer of enrichment thereon then passes beneath the middle dough hopper 4, where a second sheet of dough is superimposed thereon, covering the enrichment layer. The compound dough sheet thus formed continues to move on the conveyor 18 beneath the left-hand enrichment conveyor 12 until it arrives at a point beneath the left-hand end thereof, where the second layer of enrichment is deposited thereon. Moving onward, the compound dough sheet, now composed of two layers of dough and two layers of enrichment, moves beneath the third dough hopper 4, where a third dough layer is superimposed upon the second enrichment layer. The whole sheet then passes beneath the consolidating rolls 170 and 171, which press the layers together evenly. The upper roll 17 is mitred at its ends, and presses down the edges of the dough to seal them.

The dough sheet is then deposited upon the first dough-transfer conveyor 195, upon which it moves upwardly and is deposited upon the feeding roll 241, moving downwardly between it and the feeding roll 240 until it drops into the space between the opposite belts of the first lapper 259. Meanwhile, the first lapper has been oscillating to and fro, and the slidable members 277 at its nose portion reciprocating longitudinally in response to the reciprocation of the double rack 281 through its connection by means of the shaft 280 (Figure 6). Consequently, the lower end of the lapper moves to and fro across the first lapping conveyor 310, in the manner shown in Figures 15 to 18, inclusive. The lower end of the lapper thus remains close to the surface of the conveyor, regardless of the position into which it moves, and the dough is deposited evenly and accurately upon the conveyor.

Figure 15:
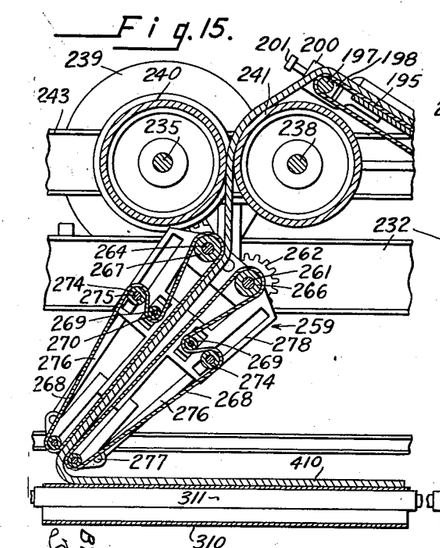
Figures 15, 16 and 17 are diagrammatic sectional views of the lapping device, similar to Figure 8 but showing the lapping device in various positions during its cycle of operation.
Figures 16, 17, 18:
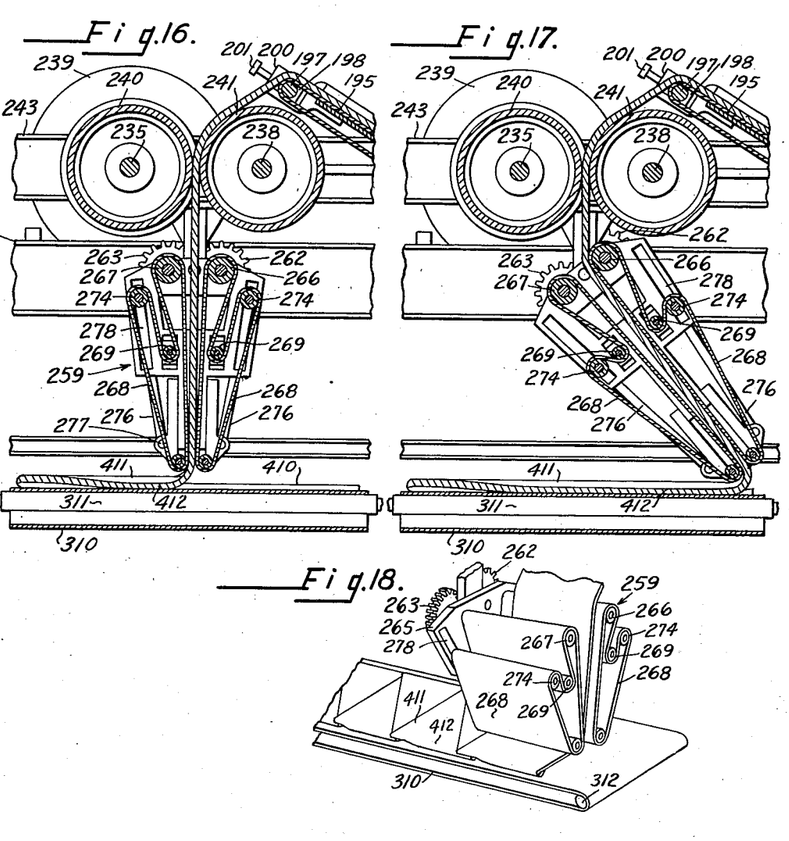
Figure 18 is a diagrammatic perspective view of the lapping device shown in Figures 15 to 17, illustrating the overlapping of the dough sheet, brought about by the travel of the lapping device to and fro across the conveyor upon which it deposits the dough sheet.

In Figure 15 the lapper has deposited one layer of dough 410 upon the lapping conveyor 310 and is at the end of its stroke, ready to begin a return stroke. In Figure 16 the lapper has half completed its return stroke, but the lapping conveyor has meanwhile moved in a direction transverse to the motion of the lapper. Accordingly, a portion 411 of the dough sheet remains superimposed upon the first laid portion 410, whereas another part 412 rests upon the lapping conveyor 310 itself where the first laid dough sheet has moved forward upon the conveyor. This action is also shown in Figure 18.

In Figure 17 the lapper has completed its return stroke and is ready to begin another forward stroke. As the lapping conveyor 310 moves forward, beneath the lapper therein, the latter deposits a layer of dough, which by the action of the resulting mechanism, pursues a zigzag path across the conveyor, overlapping the dough layers beneath it.

Beyond the first lapping conveyor 310 the now laminated dough sheet is deposited upon the second dough-transfer conveyor 336, and moves therealong until it is deposited upon the feeding roll 337 (Figure 3). The dough sheet now moves down between the feeding rolls 337 and 338 into the second lapper 339, which is also reciprocating over the second lapping conveyor 340. Here the already lapped dough is lapped a second time and the number of layers multiplied accordingly.

The thus re-lapped dough is deposited by the second lapping conveyor 340 upon the third dough-transfer conveyor 375 (Figure 2), upon which it moves upwardly and falls between the second set of consolidating rolls 396 and 400. These consolidating rolls press the various overlapping layers together and the dough emerges in a smooth sheet of substantially uniform thickness upon the fourth dough-transfer conveyor 408. The sheet moves upwardly upon this conveyor 408 and is deposited upon the subsequent apparatus, by means of which the further operations are conducted upon the dough.

Thus it will be seen that the dough sheet which finally emerges from the machine is composed of a large number of alternate layers of dough and enrichment materials, each layer being extremely thin. This arrangement results in a superior product by distributing the enrichment properly within the dough, yet accomplishing this without the repeated working and mixing of the dough carried out in the prior art processes and apparatus. The action of the improved lapping device of this invention deposits the dough evenly and accurately upon the lapping conveyor because the space between the end of the lapper and the conveyor, upon which the sheet is deposited, does not vary substantially throughout the entire stroke of the lapper.

We desire to comprehend within our invention such modifications as may be embraced within our claims and the scope of our invention.

Having thus fully described the invention, what is claimed as new and desired to be secured by Letters Patent, is:

1. A dough-lapping device comprising a conveyor, and a swinging member arranged to receive a continuous sheet of dough and deposit it upon the conveyor in overlapping layers, said swinging member being arranged to move across said conveyor with the dough-discharging portion thereof at a substantially constant distance from said conveyor.

2. A dough-lapping device comprising a conveyor, a swinging member arranged to swing to and fro across said conveyor, a reciprocating member upon said swinging member, and means for maintaining said reciprocating member at a substantially constant distance from said conveyor during the motion of said reciprocating member thereacross.

3. A dough-lapping device comprising a conveyor, a swinging member arranged to swing to and fro across said conveyor, a reciprocating member upon said swinging member, and a rack mechanism attached to said reciprocating member and adapted to move said reciprocating member across said conveyor in a path substantially parallel to said conveyor.

4. A dough-lapping device comprising a conveyor, a swinging member arranged to swing to and fro across said conveyor, a reciprocating member upon said swinging member, a pair of moving belts arranged between said reciprocating member and said swinging member, and means for causing said reciprocating member to move in a substantially straight path while said swinging member is oscillating in an arcuate path.

5. A dough-lapping device comprising a conveyor, a swinging member arranged to swing about a fixed pivot to and fro across said conveyor, a reciprocating member upon said swinging member arranged to reciprocate radially relatively to said swinging member, and means for causing said reciprocating member to move in a substantially straight path while said swinging member is moving in an arcuate path about said fixed pivot.

6. A dough-lapping device comprising a conveyor, a swinging member arranged to swing about a fixed pivot to and fro across said conveyor, a reciprocating member upon said swinging member arranged to reciprocate radially relatively to said swinging member, means for causing said reciprocating member to move in a substantially straight path while said swinging member is moving in an arcuate path about said fixed pivot, and a pair of moving belts arranged between said swinging member and said reciprocating member for urging the dough downwardly therethrough.

7. A dough-lapping device comprising a conveyor, a swinging member arranged to swing about a fixed pivot to and fro across said conveyor, a reciprocating member upon said swinging member, a movable rack connected to said reciprocating member, a guide for said rack, and means for causing said rack to reciprocate alternately in opposite directions.

8. A dough-lapping device comprising a conveyor, a swinging member arranged to swing about a fixed pivot to and fro across said conveyor, a reciprocating member upon said swinging member, a movable rack connected to said reciprocating member, a guide for said rack, and a pair of gears arranged to engage said rack alternately to cause it to reciprocate alternately in opposite directions.

9. A dough-lapping device comprising a conveyor, a swinging member arranged to swing about a fixed pivot to and fro across said conveyor, a reciprocating member upon said swinging member, a movable rack connected to said reciprocating member, a guide for said rack, said rack having two sets of rack teeth, and a pair of gears, each gear being arranged to engage one set of said rack teeth in alternate succession with the other gear, whereby to cause said rack to reciprocate alternately in opposite directions.

10. A dough-lapping device comprising a conveyor, a swinging member arranged to swing about a fixed pivot to and fro across said conveyor, a reciprocating member upon said swinging member, a movable rack connected to said reciprocating member, a guide for said rack, said rack having two sets of rack teeth, and a pair of gears, each gear being arranged to engage one set of said rack teeth in alternate succession with the other gear, whereby to cause said rack to reciprocate alternately in opposite directions, said gears having teeth along a part only of their peripheries.

KENNETH D. LOOSE.
CHARLES W. WATKINS.
JOSEPH W. GREEN.